US008838487B1

(12) United States Patent
Rieschick et al.

(10) Patent No.: US 8,838,487 B1
(45) Date of Patent: Sep. 16, 2014

(54) MAINTAINING A COMMON IDENTIFIER FOR A USER SESSION ON A COMMUNICATION NETWORK

(75) Inventors: Gary Joel Rieschick, Louisburg, KS (US); Jeremy R. Breau, Kansas City, MO (US); Raymond Robert Doerr, Gardner, KS (US); John Eric Belser, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 981 days.

(21) Appl. No.: 12/103,928

(22) Filed: Apr. 16, 2008

(51) Int. Cl.
*G07F 19/00* (2006.01)
*G06Q 30/00* (2012.01)

(52) U.S. Cl.
CPC ................................ *G06Q 30/0185* (2013.01)
USPC .................................................. 705/34; 726/3

(58) Field of Classification Search
CPC ................................................. G06Q 30/0185
USPC ............................................................. 705/34
See application file for complete search history.

(56) References Cited

U.S. PATENT DOCUMENTS

| | | | |
|---|---|---|---|
| 5,615,351 A * | 3/1997 | Loeb | 700/90 |
| 6,408,173 B1 * | 6/2002 | Bertrand et al. | 455/406 |
| 6,701,147 B1 | 3/2004 | Ananthakrishnan | |
| 2008/0076413 A1 * | 3/2008 | Jones | 455/432.3 |

OTHER PUBLICATIONS

Nortel Networks, "3GPP IP Multimedia Subsytem (IMS) May Well Turn Out to be the Most Significant Advancement in Third Generation Mobile Telephony in the Years to Come. Marcella Secli Tells Us Why," Jan. 12, 2008, 4 pages, http://www.nortel.com/corporate/global/emea/dialogue/wireless/opinion_092303.html.

* cited by examiner

*Primary Examiner* — Ramsey Refai

(57) ABSTRACT

A method for maintaining a common billing identifier for a user session in a communication network is presented. In the method, an authentication node of the communication network receives a first authentication request associated with a user session. In response to the first authentication request, a billing identifier associated with the user session is transferred from the authentication node to a source of the first authentication request. A second authentication request associated with the same user session is received at the authentication node. In response to the second authentication request, the same billing identifier is transferred from the authentication node to a source of the second authentication request.

5 Claims, 6 Drawing Sheets

US 8,838,487 B1

MAINTAINING A COMMON IDENTIFIER FOR A USER SESSION ON A COMMUNICATION NETWORK

TECHNICAL BACKGROUND

Most communication networks typically include multiple interconnected systems, each of which provides some identifiable service or capability, such as Internet connectivity, file download capability, and push-to-talk (PTT) functionality, to a network user. Further, the user may utilize several of these services during a single user "session," or logical connection between the user and the network. In response to the user employing the various services, each of the individual systems typically generates data records indicating the employed service, a user identifier (such as a network address identifier, or "NAI"), and other information useful in determining an amount to charge the user for the service. The charges may be based on a length of time, an amount of data, a number of accesses, or other unit of measure associated with the service. Thereafter, the data records are routed to one or more billing systems, which the communication service provider processes to bill the user for charges accumulated over a period of time, such as a month, which may encompass many user sessions.

In some circumstances, charges associated with one service may affect the amount charged for another service used during the same session. For example, a user may be charged for a total number of bytes transferred during a session by one system, while also being charged for a specific file download during that same session. Under such conditions, the service provider may reduce the charge for the total number of bytes transferred by the size of the file download to eliminate any potential double-billing. To this end, the billing systems often attempt to identify all of the charges associated with a particular user session to reconcile or correlate those charges. To aid in this identification, each system providing a service often indicates the time period of the session, such as a start time and a stop time for the session, along with the user identifier in the data records transferred to the billing system. In other cases, each system may also provide a session identifier. Since each system generates a separate time period and session identifier for each user session, the time periods cited by each system may not closely align with each other, and the identifiers are not likely to match, thus introducing some inaccuracy in identifying all relevant charges for that session. Further, identifying all of the data records for a particular user session in this manner may be considered rather complex and time-consuming, even when a separate mediation system is employed to perform this task.

Overview

Discussed herein is a method for maintaining a common billing identifier for a user session in a communication network. In the method, an authentication node of the communication network receives a first authentication request associated with a user session. In response to the first authentication request, a billing identifier associated with the user session is transferred from the authentication node to a source of the first authentication request. The authentication node also receives a second authentication request associated with the user session. In response to the second authentication request, the billing identifier is transferred from the authentication node to a source of the second authentication request.

Also provided is a communication network that maintains a common billing identifier for a user session. The system includes an authentication node configured to receive a first authentication request associated with a user session, transfer a billing identifier to a source of the first authentication request in response to the first authentication request, receive a second authentication request associated with the user session, and transfer the billing identifier to a source of the second authentication request in response to the second authentication request.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
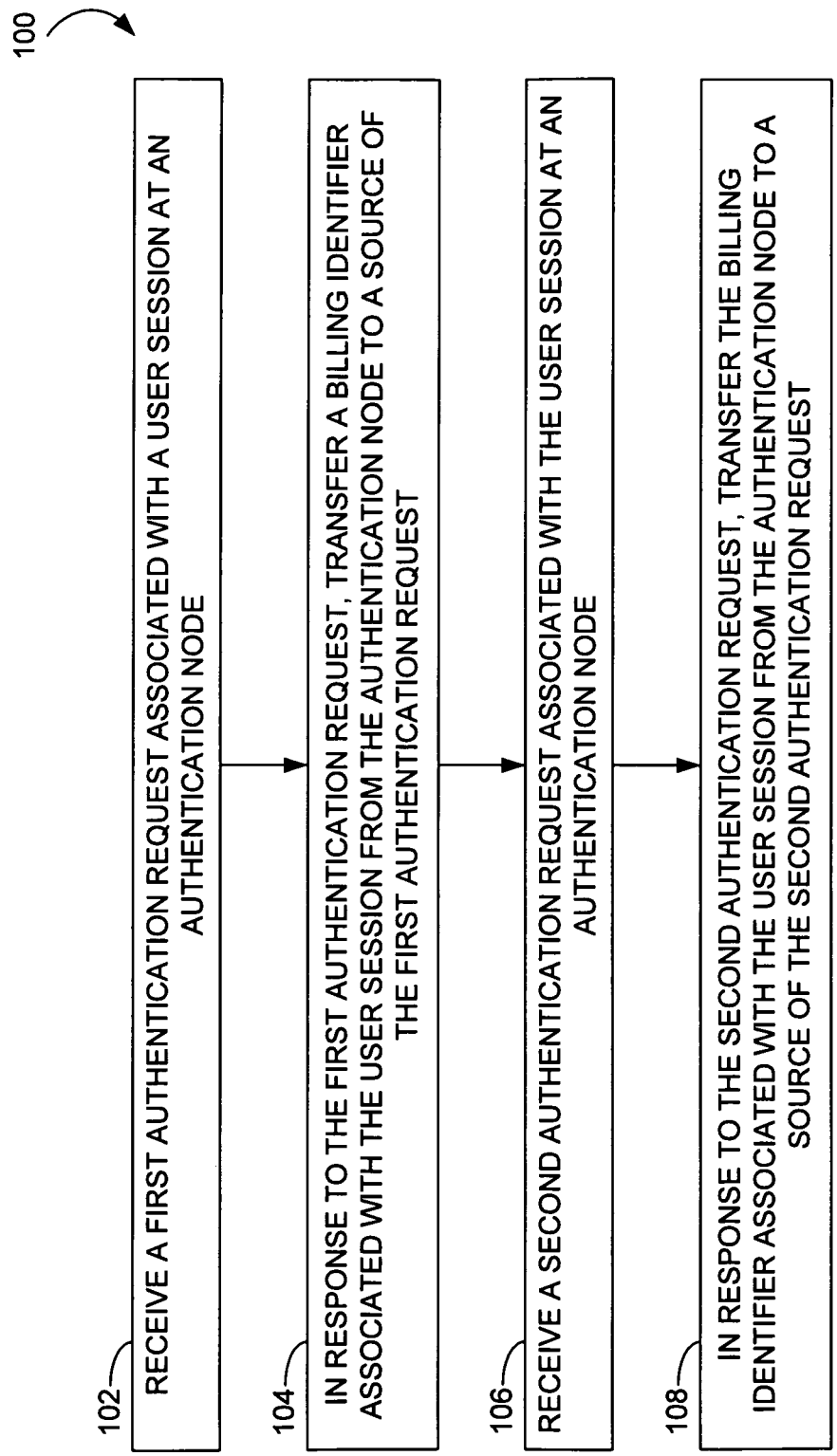
FIG. 1 is a flow diagram illustrating a method according to an embodiment of the invention for maintaining a common identifier for a user session in a communication network.

FIG. 1 provides a flow diagram of a method 100 according to an embodiment of the invention for maintaining a common billing identifier for a user session in a communication network. In the method 100, an authentication node of the communication network receives a first authentication request associated with a user session (operation 102). In response to the first authentication request, a billing identifier associated with the user session is transferred from the authentication node to a source of the first authentication request (operation 104). The authentication node also receives a second authentication request associated with the user session (operation 106). In response to the second authentication request, the authentication node transfers the same billing identifier to a source of the second authentication request (operation 108).

Figure 2:
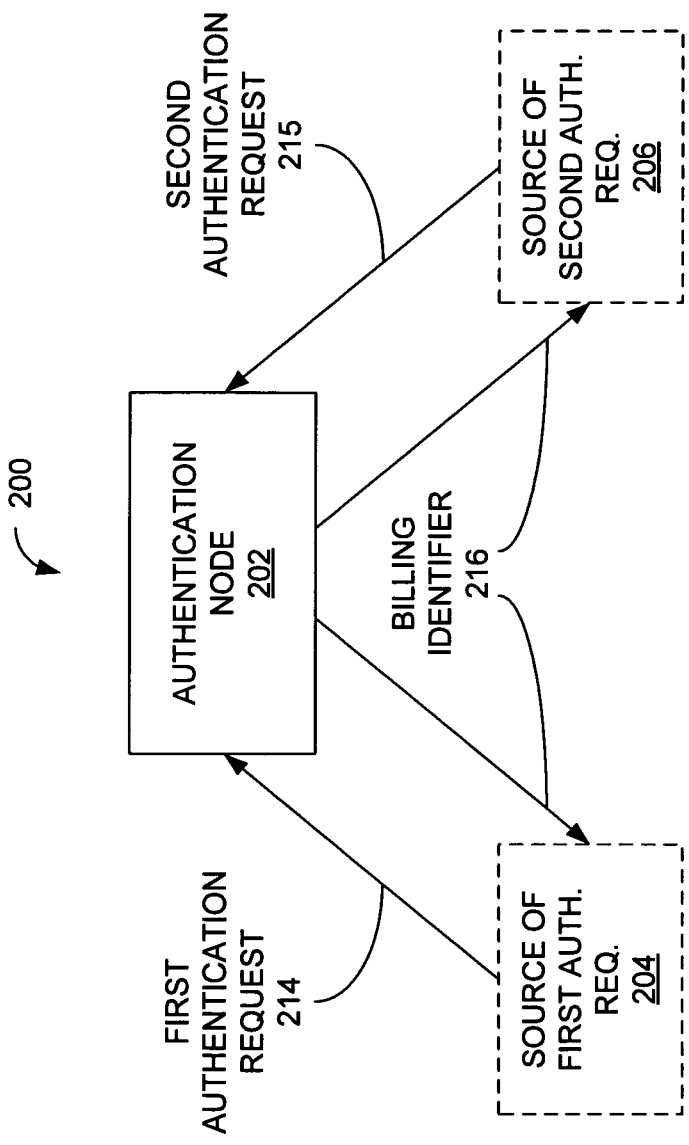
FIG. 2 is a block diagram of a communication network according to an embodiment of the invention that maintains a common identifier for a user session.

FIG. 2 provides another example embodiment: a communication network 200 that includes an authentication node 202. The authentication node 202 is configured to receive a first authentication request 214 associated with a user session. The authentication node 202 is also configured to transfer a billing identifier 216 to a source 204 of the first authentication request 214 in response to the first authentication request 214. Also, the authentication node 202 is configured to receive a second authentication request 215 associated with the user session. In response to the second authentication request 215, the authentication node 202 is configured to transfer the billing identifier 216 to the source 206 of the second authentication request 215. In one embodiment, the source 204 of the first authentication request 214 and the source 206 of the second authorization request 215 are included within the communication network 200.

Figure 3:
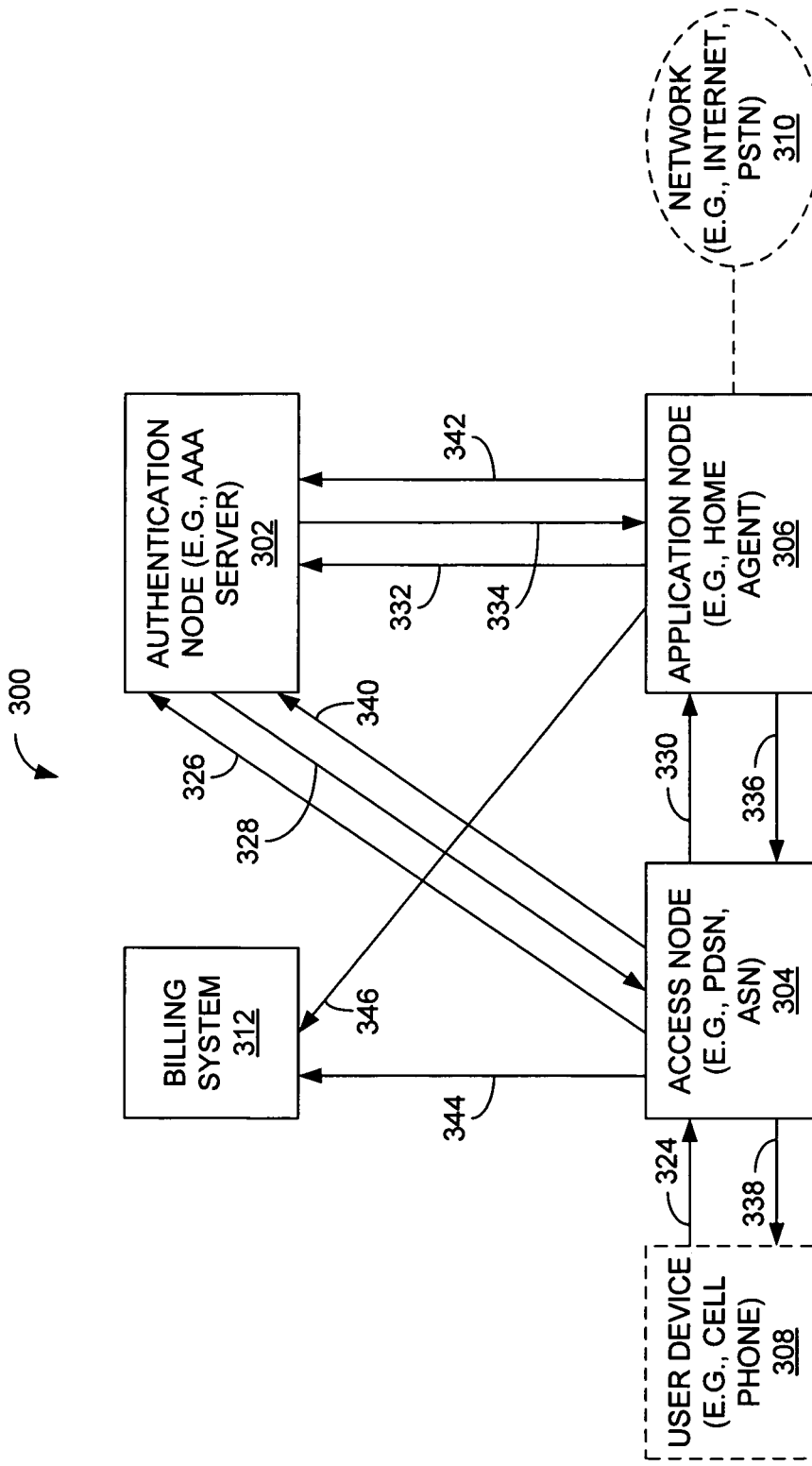
FIG. 3 is a block diagram of a communication network according to another embodiment of the invention that maintains a common identifier for a user session.

In another embodiment depicted in FIG. 3, a communication network 300 includes an authentication node 302, an access node 304, an application node 306, and a billing system 312. A user device 308 may employ the communication network 300 to access various assets of another network 310, such as the Internet, a public switched telephone network (PSTN), or other wide area network (WAN), or may access services provided directly by the communication network 300. Other potential components, such as base transceiver stations (BTSes), base station controllers (BSCs), mobile switching centers (MSCs), switches, routers, and the like, that may operate within the network 300 are not shown in FIG. 3 to simplify and facilitate the following discussion.

The user device 308 may be any device capable of communicating with the communication network 300. Examples of the user device 308 include a cellular phone, a personal digital assistant (PDA), a desktop or laptop computer, or other communication device. Further, the user device 308 may be coupled with the communication system 300 by wired or wireless connection, or via other means of communication.

The access node 304 of FIG. 3 may serve as a connection point or gateway for the user device 308 to the remainder of the communication network 300. For example, the access node 304 may be a packet data serving node (PDSN) for a mobile wireless communication network, an access service network (ASN) for a WiMAX communication network, or some combination thereof. The access node 304 also provides messaging to other systems for authentication and authorization of the user device 308 to use the communication network 300. The access node 304 also generates usage data records (UDRs) indicating general usage of the network 300 by the user device 308 for billing purposes. These UDRs are ultimately transferred to the billing system 312, discussed more fully below.

The application node 306 of FIG. 3 may serve as an interface through which access is provided to specific applications or services available within the communication network 300. For example, the application node 306 may provide access to a file database, such as audio or video clips, or access to a push-to-talk (PTT) service. To that end, the application node 306 facilitates messaging with other systems within the network 300 to acquire authentication or authorization needed for the user device 308 to access those services. Also, similar to the access node 304, the application node 306 tracks charges that are applicable to the user device 308 that relate to the various applications being accessed. These charges are reflected in usage data records, sometimes referred to as application data records (ADRs), which are transferred to the billing system 312. In one implementation, the application node 306 may be a home agent, such as that associated with a mobile Internet Protocol (mobile IP, or MIP) network. Within that environment, the application node 306 may also be responsible for setting and tracking a mobile IP address for the user device 308 when the device is connected to the communication network 300 or another network.

The authentication node 302 of FIG. 3 may provide authentication of user devices, such as the user device 308, as requested by the access node 304 and the application node 306. This authentication is implemented by way of messaging between the authentication node 302, the access node 304, and the application node 306. In one embodiment, the authentication node 302 is an authentication, authorization, and accounting (AAA) server. As a result, the authentication node 302 may also play a role in the billing aspects of the communication network 300, as described in greater detail below. In one example, the authentication network 300 may transfer any UDRs and ADRs it receives and forward them to the billing system 312.

The billing system 312, as shown in FIG. 3, is configured to receive UDRs and ADRs, either directly from the access node 304 and the application node 306 or via the authentication node 302. The billing system 312 collects these data records over a billing period, such as a month, and processes them to generate bills for charges associated with the user device 308 for that period. More specifically, the billing system 312 may identify all data records associated for a particular user session, and reconcile the various charges for that session to account for any duplicative billing. For example, presuming the user device 308 has downloaded 1000 kilobytes (KB) of data overall during a session. This amount of data may be reflected in a UDR transferred from the access node 304 to the billing system 312. Of those 1000 KB, 500 KB of data may have been downloaded as a result of a separately billable service provided through the application node 306, which may be reflected in a separate ADR transferred from the application node 306 to the billing system 312. Thus, the two records (i.e., the UDR for 1000 KB and the ADR for the file download) reflect a charge for the file download event, and a separate charge for the amount of data involved in the file download, resulting in an overcharge for the download event. To remedy this situation, the billing system 312 may reconcile the two data records for that session, resulting in a charge associated with the 500 KB download through the application node 306, and a separate charge of 500 KB (1000 KB total minus the 500 KB download) for the remaining amount of data transferred to the user device 308.

Figure 4:
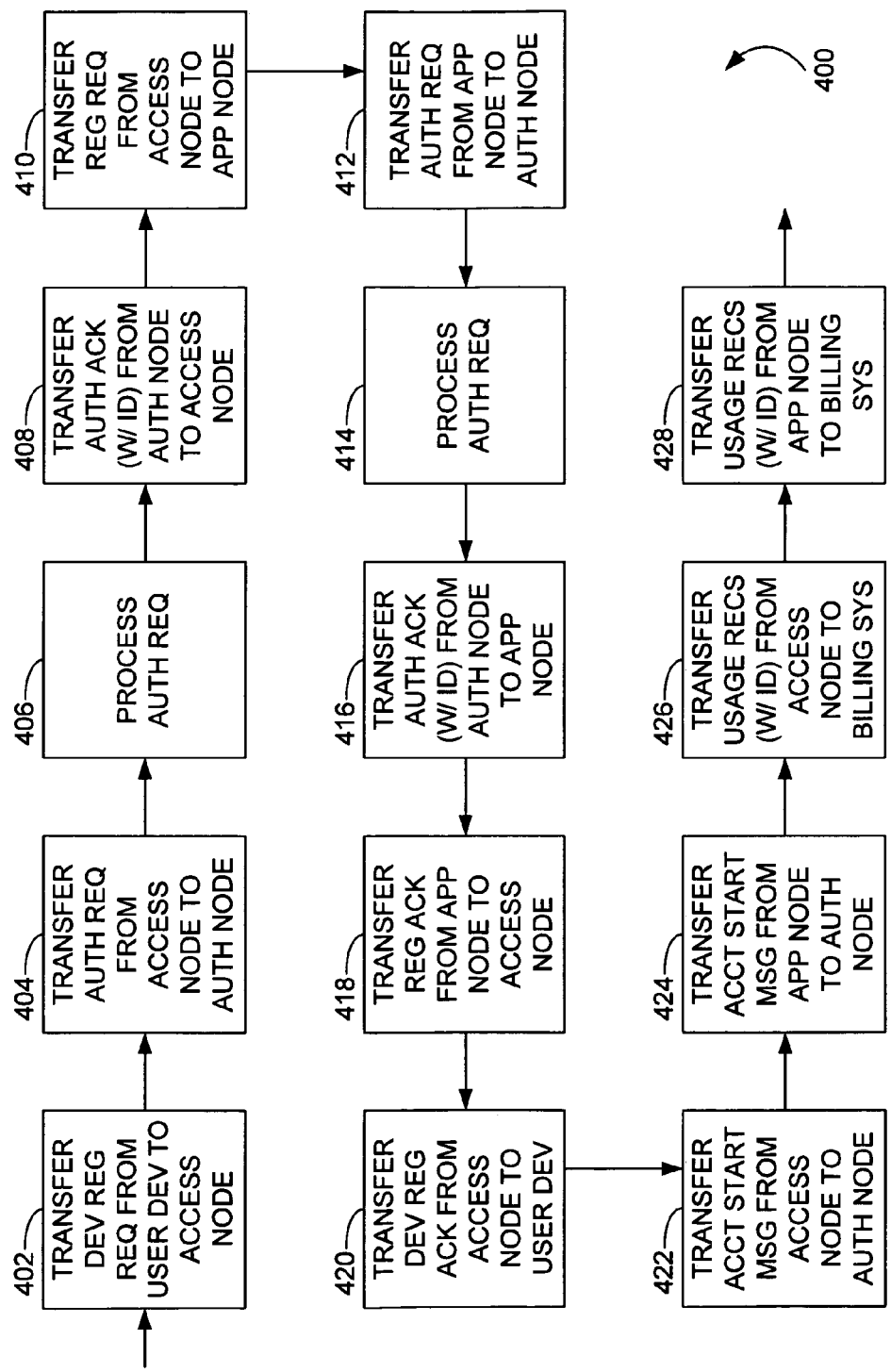
FIG. 4 is a flow diagram of a method for operating the communication network of FIG. 3 according to an embodiment of the invention.

To aid the billing system 312 in performing the reconciliation process accurately, the communication system 300 is configured to incorporate a common billing ID for a particular user session in each of the usage and application data records received at the billing system 312. FIG. 4 provides a flow diagram of a method 400 for operating the communication system 300 of FIG. 3 in one implementation. However, systems other than the specific communication system 300 may be employed in other embodiments to perform the operations of the method 400.

In order to simplify the following discussion, the user device 308 is presumed to be a properly authentic device for accessing the services provided by the communication network 300. Also, the information passed between the various nodes of the network 300, such as authentication requests and acknowledgments, are often embodied as messages transferred through the network 300. These messages are shown by way of arrows in FIG. 3. Further, while the arrows of FIG. 3 denote the source and destination of each message, the arrows do not necessarily indicate a direct connection between the various nodes, as each message may be passed through other nodes, or through switches or routers not specifically depicted in FIG. 3. Moreover, while the operations of FIG. 4 are displayed in a specific order, other orders of execution for the various operations, including concurrent execution of one or more operations, may be possible while remaining within the scope of the invention.

In the method 400 of FIG. 4, the user device 308 transfers a device registration request 324 to the access node 304 (operation 402). Generally, this device registration request 324 initiates a user session on the network 300 involving the user device 308 In response to the device registration request 324, the access node 304 attempts to authenticate and/or authorize the user device 308 as being allowed to access the communication network 300 by sending an authentication request 326 to the authentication node 302 (operation 404).

After receiving the authentication request 326, the authentication node 302 processes the authentication request 326 to verify the identity of the user device 308 as a device authenticated and/or authorized to access the network 300 (operation 406). Typically, such processing involves comparing an identifier of the user device 308 included within the authentication request 326 with a database (not shown in FIG. 3) located within, or coupled to, the authentication node 302. Presuming positive authentication of the user device 308, the authentication node 302 returns an authentication acknowledgment 328 to the access node 304 (operation 408). The authentication acknowledgement 328 includes a billing identifier (also termed a correlation identifier) associated with the user session initiated by user device 308. In the embodiment of FIG. 3, the authentication node 302 is responsible for generating and storing the billing identifier internally for later use during the session.

In response to receiving the authentication acknowledgment 328, the access node 304 transfers a registration request 330 to the application node 306 (operation 410). This registration request 330 initiates the process whereby the user device 308 is allowed to access specific services, such as Internet access, file download capability, and PTT functionality, made available via the network 300. In one implementation, the registration request 330 takes the form of a mobile IP (MIP) message informing the application node 306 of the presence of the user device 308 within the area serviced by the application node 306.

In response to the registration request 330, the application node 306 transfers a second authentication request 332 to the authentication node 302 (operation 412). The second authentication request 332 references the same user device 308 indicated in the first authentication request message 326 received earlier at the authentication node 302. After processing the second authentication request 332 (operation 414) and recognizing that the same user device 308 is involved, the authentication node 302 returns a second authentication acknowledgment 334, including the same billing identifier mentioned above, to the application node 306 (operation 416). As a result, both the access node 304 and the application node 306 possess the same billing identifier associated with the current user session initiated by the user device 308.

After receiving the second authentication acknowledgment 334, the application node 306 responds to the registration request 330 previously received from the access node 304 by issuing a registration acknowledgment 336 back to the access node 304 (operation 418). In one embodiment, the registration acknowledgment 336 is an MIP message. After receiving the registration acknowledgment 336, the access node 304 transfers a device registration acknowledgment 338 to the user device 308 (operation 420) as a response to the original device registration request 324 received from the user device 308.

If the authentication node 302 is a AAA server, as posited above, the access node 304 then transfers an accounting start message 340 to the authentication node 302 (operation 422), and the application node 306 transfers a second accounting start message 342 to the authentication node 302 (operation 424), with each message 324 including the billing identifier. In one example, the accounting start messages 340, 342 are formatted according to the Remote Authentication Dial-In User Service (RADIUS) protocol commonly employed by AAA servers.

At this point in the method 400, the communication network 300 in general, and the access node 304 and the application node 306 in particular, are prepared to track usage of the communication network 300 (in the case of the access node 304) and usage of specific applications or services provided through the network 300 (in the case of the application node 306) related to the user session initiated by the user device 308. As a result of this tracking, both the access node 304 and the application node 306 generate data records quantifying this usage during the session. Generically, these data records are referred to herein as "usage data records." More specifically, the access node 304 may produce usage data records (UDRs) while the application node 306 generates application data records (ADRs), each of which include the billing identifier discussed above. The access node 304 transfers the UDRs 344 to the billing system 312 (operation 426), while the application node 306 sends the generated ADRs 346 to the billing system 312 (operation 428).

In receiving the UDRs 344 and ADRs 346, each of which includes a common billing identifier indicating the same user session, the billing system 312 may compare and reconcile the usage data records for the session, thus allowing the billing system 312 to bill a user of the user device 308 an amount that accurately reflects the actual usage of the network 300 during the user session, as described in the example above.

Figure 5:
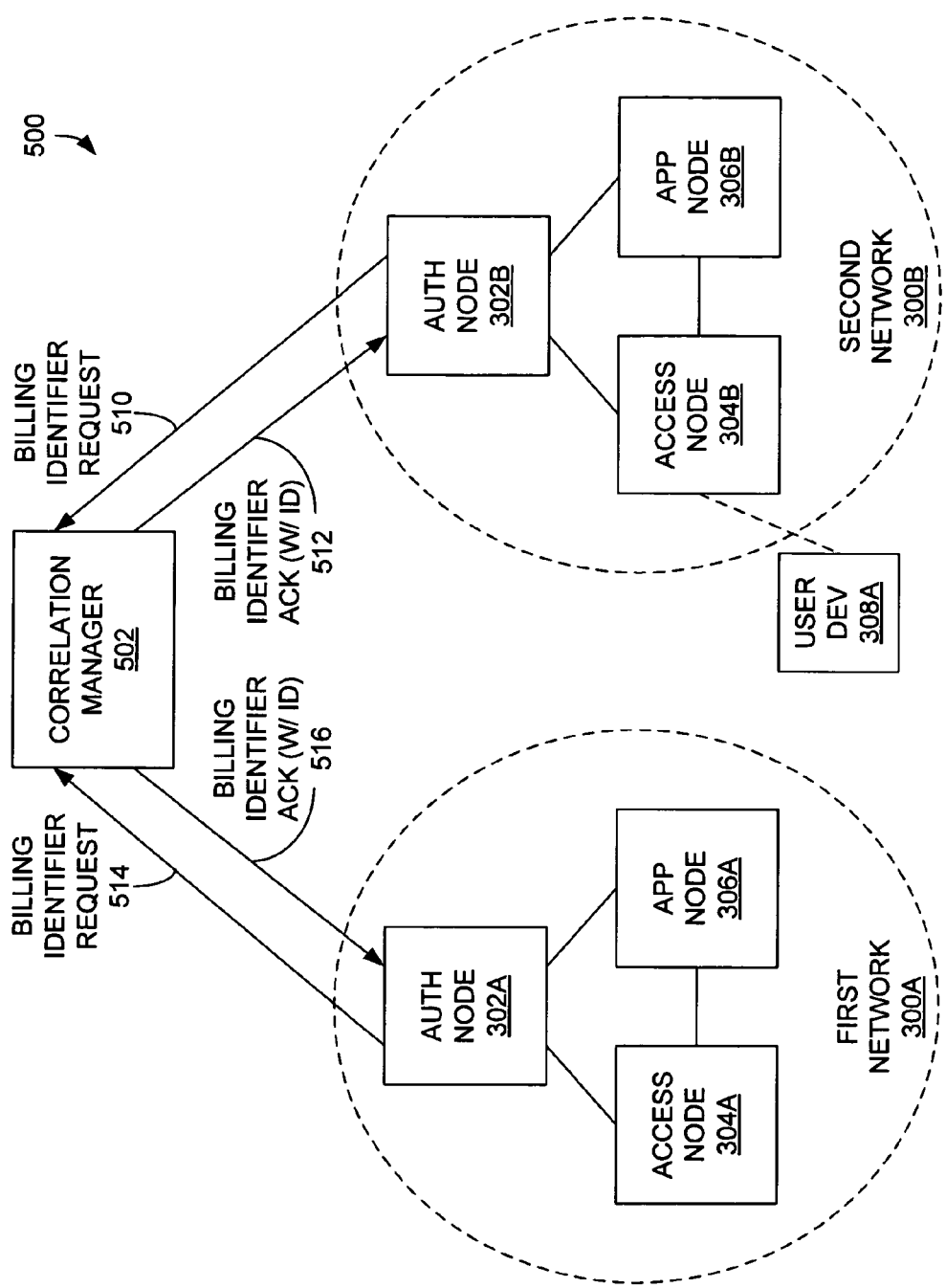
FIG. 5 is a block diagram depicting two communication networks in communication with a correlation manager according to another embodiment of the invention.

The embodiment of FIG. 3 provides for the generation of a common billing identifier for activity involved in a user session for cases in which all applications or services are charged solely by the communication network 300. However, in some circumstances, communication services may be supplied, and hence tracked, by another communication network. FIG. 5 illustrates such a scenario, in which a first network 300A and a second network 300B may communicate or otherwise cooperate to provide services to a mobile user device 308A in a combined network 500. Each network 300A, 300B is shown with the same network nodes 302, 304, 306 discussed above in conjunction with FIG. 3, although the networks 300A, 300B may provide other nodes and arrangements in other embodiments. Also, while the communication networks 300A, 300B are shown as being geographically distinct in scope, the range of the networks 300A, 300B may in fact overlap considerably.

In one example, the mobile user device 308A based with the first network 300A may be accessing services provided by the first network 300A during a user session initiated through the second network 300B due to better wireless connectivity of the device 308A with the second network 300B. In order to generate a common billing identifier in both networks 300A, 300B for the user session, a correlation manager 502 communicates with the authentication node 302A of the first network 300A and the authentication node 302B of the second network 300B. More specifically, upon receiving an authentication request (such as the first authentication request 326 of FIG. 3), the authentication node 302B may transfer a billing identifier request 510 to the correlation manager 502 instead of generating the billing identifier itself. In response, the correlation manager 502 issues to the authentication node 302B of the second network 300B a billing identifier acknowledgment 512 containing a billing identifier, which is then distributed to the access node 304B and the application node 306B of the second network 300B.

Similarly, authentication requests received by the authentication node 302A resulting from the user device 308A requesting access to services of the first network 300A may cause the authentication node 302A to issue a second billing identifier request 514 to the correlation manager 502. In response, the correlation manager then transfers the same billing identifier in a billing identifier acknowledgment 516 to the authentication node 302A, which then distributes the billing identifier to the access node 304A and the application node 306A. As a result, the same billing identifier is employed for the same user session in both the first network 300A and the second network 300B. In another example, the authentication node 302A of the first network 300A issues the first billing identifier request to the correlation manager 502.

Figure 6:
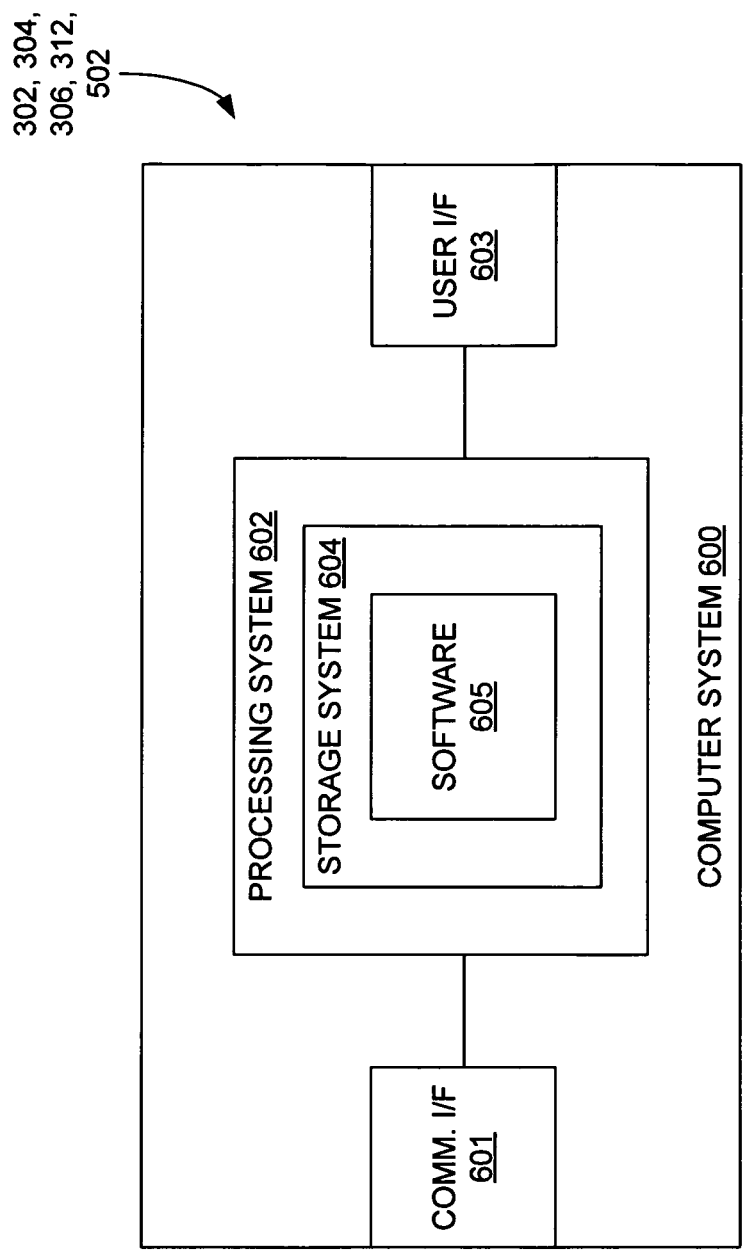
FIG. 6 is a block diagram of a computer system employable in a communication network that maintains a common identifier for a user session according to an embodiment of the invention.

Any of the nodes discussed above, such as the authentication node 302, the access node 304, the application node 306, the billing system 312, and the correlation manager 502, either separately or in combination, may be a computer system 600, as depicted in FIG. 6. In one example, the computer system 600 includes a communication interface 601, a processing system 602, and a user interface 603. The processing system 602 includes a storage system 604. The storage system 604 stores software 605. The processing system 602 is linked to the communication interface 601 and the user interface 603. The computer system 600 may include a programmed general-purpose computer, although those skilled in the art will appreciate that programmable or special purpose circuitry and equipment may be used. The computer system 600 may be distributed among multiple devices that together constitute elements 601-605.

More specifically, the communication interface 601 could include a network interface, modem, port, transceiver, or some other communication device. The communication interface 601 may be employed to communicate with any of the other nodes or devices depicted in FIGS. 3 and 5. The communication interface 601 may be distributed among multiple communication devices. The processing system 602 could include a computer microprocessor, logic circuit, or some other processing device. Also, the processing system 602 may be distributed among multiple processing devices. The user interface 603 could include a keyboard, mouse, voice recognition interface, microphone and speakers, graphical display, touch screen, or some other type of user device. The user interface 603 may be distributed among multiple user devices. The storage system 604 could include a disk, tape, integrated circuit, server, or some other memory device. The storage system 604 may be distributed among multiple memory devices.

The processing system 602 retrieves and executes the software 605 from the storage system 604. The software 605 may include an operating system, utilities, drivers, networking software, and other software typically loaded onto a computer system. The software 605 could include an application program, firmware, or some other form of machine-readable processing instructions. When executed by the processing system 602, the software 605 may direct the processing system 602 to perform any of the operations described above, as well as those operations illustrated in FIG. 4.

Various embodiments as described above facilitate the generation, distribution, and maintenance of a single common billing identifier associated with a user session serviced by a communication network. Accordingly, each network node generating usage data records may incorporate the same billing identifier for a particular user session. As a result, the work of a billing system receiving the records is simplified, as identifying all of the records associated with a single user session is accomplished by way of correlating all records that include the same billing identifier, resulting in quick and accurate reconciliation of the charges resulting from the session.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for maintaining a common billing identifier for a user session in a communication network, the method comprising:
at an authentication, authorization, and accounting (AAA) server of the communication network, receiving a first authentication request associated with a user session;
in response to the first authentication request, transferring a billing identifier associated with the user session from the AAA server to a source of the first authentication request comprising an access node of the communication network;
at the AAA server, receiving a second authentication request associated with the user session, wherein the second authentication request is transferred to the AAA server from a source of the second authentication request, comprising an application node of the communication network, in response to the application node receiving a registration request associated with the user session from the access node; and
in response to the second authentication request, transferring the billing identifier from the AAA server to the application node.

2. The method of claim 1, further comprising:
at the AAA server, generating a billing identifier request in response to the first authentication request;
transferring the billing identifier request from the AAA server to a correlation manager; and
in response to the billing identifier request, transferring the billing identifier from the correlation manager to the AAA server.

3. The method of claim 1, further comprising:
at the AAA server, generating the billing identifier in response to the first authentication request.

4. The method of claim 1, further comprising:
at the AAA server, generating a first authentication acknowledgment in response to the first authentication request, wherein the first authentication acknowledgment comprises the billing identifier;
wherein transferring the billing identifier from the AAA server to the source of the first authentication request comprises transferring the first authentication acknowledgment from the AAA server to the source of the first authentication request.

5. The method of claim 1, further comprising:
at the AAA server, generating a second authentication acknowledgment in response to the second authentication request, wherein the second authentication acknowledgment comprises the billing identifier;
wherein transferring the billing identifier from the AAA server to the source of the second authentication request comprises transferring the second authentication acknowledgment from the AAA server to the source of the second authentication request.

* * * * *